United States Patent [19]

Diekevers

[11] Patent Number: 5,026,329

[45] Date of Patent: Jun. 25, 1991

[54] ISOLATED DRIVE SPROCKET ASSEMBLY

[75] Inventor: Mark S. Diekevers, East Peoria, Ill.

[73] Assignee: Catepillar Inc., Peoria, Ill.

[21] Appl. No.: 562,498

[22] Filed: Aug. 2, 1990

[51] Int. Cl.[5] ............................................. F16H 55/30
[52] U.S. Cl. .................................................. 474/162
[58] Field of Search .................... 474/161, 162, 94;
74/243; 305/10

[56] References Cited

U.S. PATENT DOCUMENTS 4,111,064 9/1978 Purcell .................................. 474/162
4,585,431 4/1986 Umeda et al. ................... 474/161 X Primary Examiner—Thuy M. Bui
Attorney, Agent, or Firm—Claude F. White

[57] ABSTRACT

A drive sprocket assembly for driving an endless track chain assembly for propelling a vehicle includes a support hub, which is mountable to the power drive system of the vehicle, and a plurality of replaceable sprocket segments which are secured to the support hub. Each sprocket segment includes replaceable teeth which are resiliently isolated from the other components of the sprocket segment by a plurality of non-metallic resilient discs, thus reducing noise generated by the sprocket teeth striking the endless chain assembly. Conventional drive sprocket assemblies use a one-piece toothed sprocket, or tooth segments having several teeth, bolted directly to a support member. These prior sprocket assemblies generate considerable noise and vibration from impacting of the teeth with an endless chain. The subject sprocket assembly produces low levels of noise by utilizing individual replaceable teeth, or teeth segments, which are isolated from the other components of the sprocket segments by resilient discs.

17 Claims, 6 Drawing Sheets

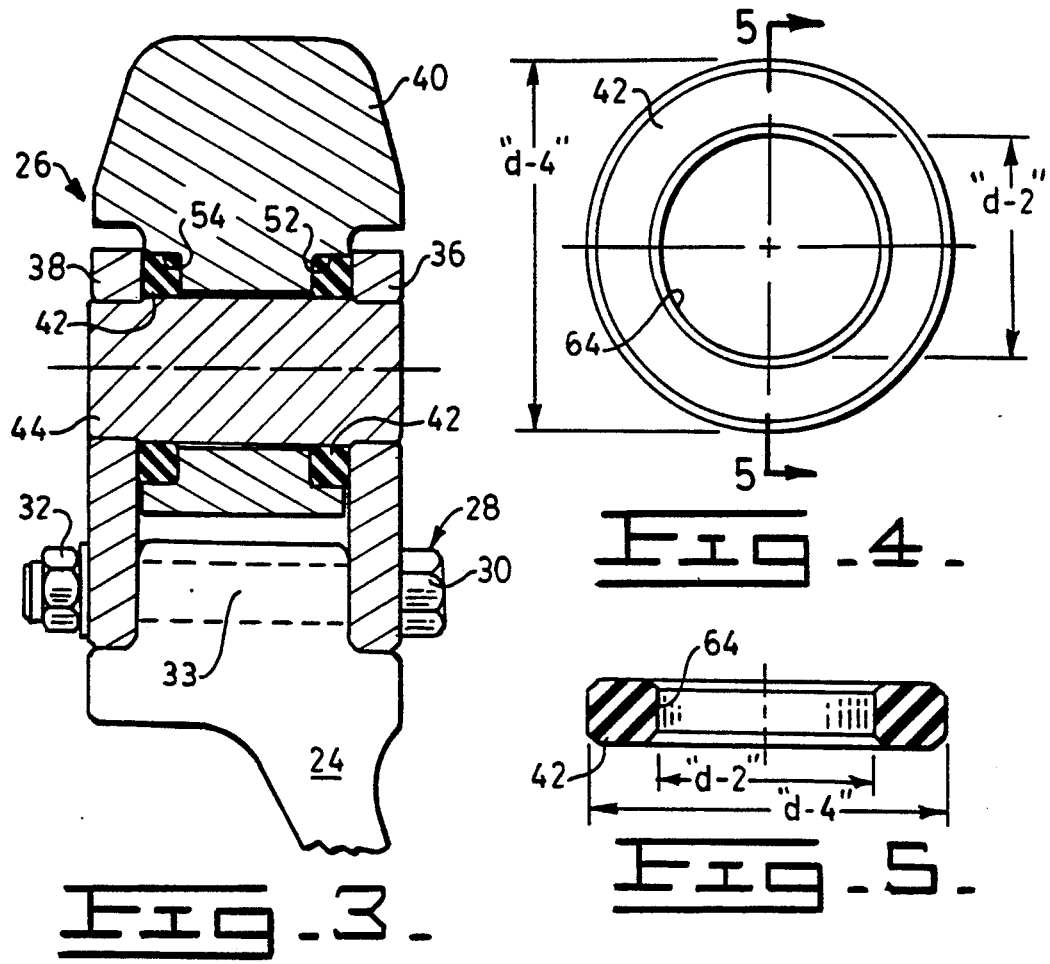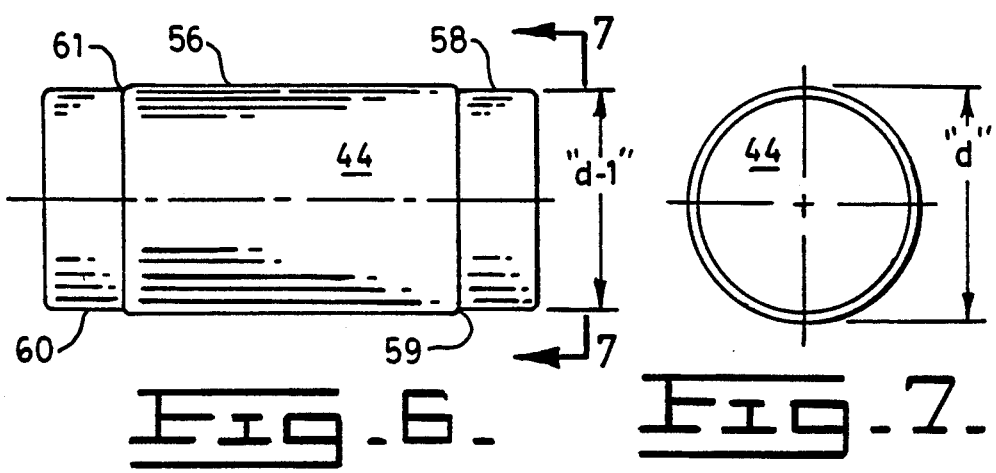

ISOLATED DRIVE SPROCKET ASSEMBLY

TECHNICAL FIELD

This invention relates generally to a sprocket assembly for a track-type vehicle and more particularly to a drive sprocket assembly having a plurality sprocket segments, with each segment having a plurality of replaceable drive teeth and a plurality of resilient isolation discs, with each drive tooth being resiliently isolated from adjacent teeth and from other structural elements of the sprocket assembly.

BACKGROUND ART

Construction and earthmoving vehicles, which utilize endless self-laying track chain assemblies for support and propulsion, generally include a sprocket wheel to engage and drive the track chain. Many different types of sprocket wheels have been used in the past, including a wheel having a plurality of integrally formed teeth, a circular support member for supporting several sprocket segments with each segment having several teeth, and hub members accommodating a plurality of separate, individual teeth. Many of the previous sprocket wheels have included resilient means for isolating and dampening the sprocket wheel noise.

One type of sprocket wheel having a plurality of separate, individual teeth bolted to a hub portion is disclosed in U.S. Pat. No. 2,365,555, issued to H. D. Geyer et al. on December, 1944. In this patent, the teeth are fulcrumed to the hub portion somewhere near the middle of the teeth so the teeth can rotate in either direction about the fulcrum. Resilient means are provided to return the teeth to their original no load position. This arrangement is intended to make the teeth self adjusting to accommodate variations in the track chain.

Another type of sprocket assembly with replaceable teeth is shown in U.S. Pat. No. 4,522,611, issued to D. M. Hiatt on Jul. 1, 1985. This patent discloses a generally cylindrical sprocket hub equipped with a plurality of L-shaped pockets in the periphery of the hub. A replaceable tooth, having a partially T-shaped inner end, is intended to be received within each of the L-shaped pockets and locked in place by wedge lock means, which operate against the T-shape of the tooth.

Each of the above-noted sprocket assemblies provide individual replaceable drive teeth. However, such sprocket assemblies appear to be quite complicated and costly, and utilize intricately formed pieces. The above-noted sprocket assemblies would appear ineffective or quite limited in their ability to reduce noise levels during driving operations against an endless track chain assembly.

The present invention is directed to overcoming one or more of the problems as set forth above.

DISCLOSURE OF THE INVENTION

In one aspect of the present invention, an isolated drive sprocket assembly includes a support hub and a plurality of sprocket segments secured to the hub to form a circular sprocket wheel. Each sprocket segment has first and second spaced side plates, a plurality of drive teeth positioned between the side plates, a plurality of resilient discs, and a plurality of retaining pins which penetrate the side plates and the drive teeth.

Self-laying track-type vehicles, which utilize endless track assemblies to support and propel the vehicle, transfer the power from the vehicle to the endless tracks via toothed sprocket members. As the sprocket teeth contact the track elements, noise and vibration is generated. This noise can reach objectionable levels. Additionally, the noise is often transferred into the endless tracks and other machine components where it is amplified. The subject invention provides a reduced noise level sprocket assembly for driving the endless tracks by utilizing a plurality of drive teeth of low mass which are resiliently isolated from other components of the sprocket assembly. Additionally, the undercarriage components and power train of the vehicle will experience lower stress since the resiliency of the subject sprocket assembly will dampen shock loads.

BRIEF DESCRIPTION OF THE DRAWINGS

FIG. 3 is a diagrammatic sectional view taken generally along the lines 3—3 of FIG. 2;

FIG. 4 is an enlarged diagrammatic side elevational view of a resilient disc of the present invention;

FIG. 5 is a diagrammatic sectional view taken generally along the lines 5—5 of FIG. 4;

FIG. 6 is an enlarged diagrammatic plan view of a retaining pin of the present invention;

FIG. 7 is a diagrammatic end view taken generally along the lines 7—7 of FIG. 6;

BEST MODE FOR CARRYING OUT THE INVENTION

Figure 1:
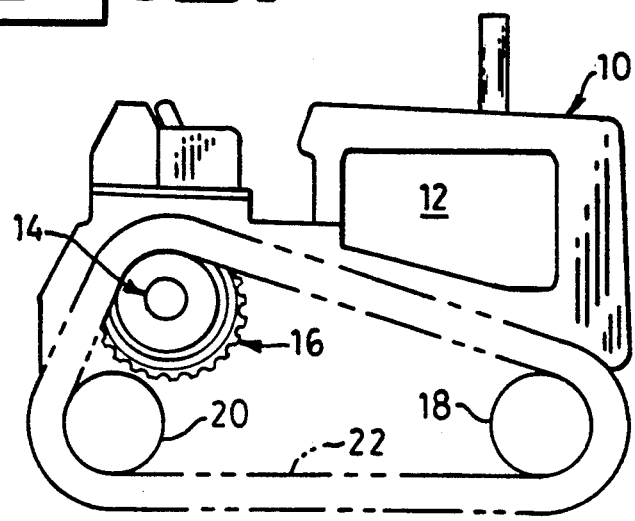
FIG. 1 is a diagrammatic side elevational view of a track-type vehicle incorporating the sprocket assembly of the present invention.

Referring to the drawings, a vehicle 10, such as a track-type tractor 10, has an engine 12, a powered drive system 14, an isolated drive sprocket assembly 16, first and second idler wheels 18,20, and an endless track chain assembly 22 which encircles the sprocket assembly 16 and the idler wheels 18,20. The engine 12 provides power to the powered drive system 14, which in turn drives the sprocket assembly 16. Power is thereby transferred from the vehicle 10 to the track assembly 22 through the sprocket assembly 16. It is to be understood that many of the vehicle components, including the sprocket assembly 16, the idler wheels 18,20, and the track chain assembly 22, are duplicated on the side of the vehicle 10 which is not illustrated. Since these duplicated components operate in the same manner as those shown, the description and operation of the components illustrated applies to both sides of the vehicle 10.

Figure 2:
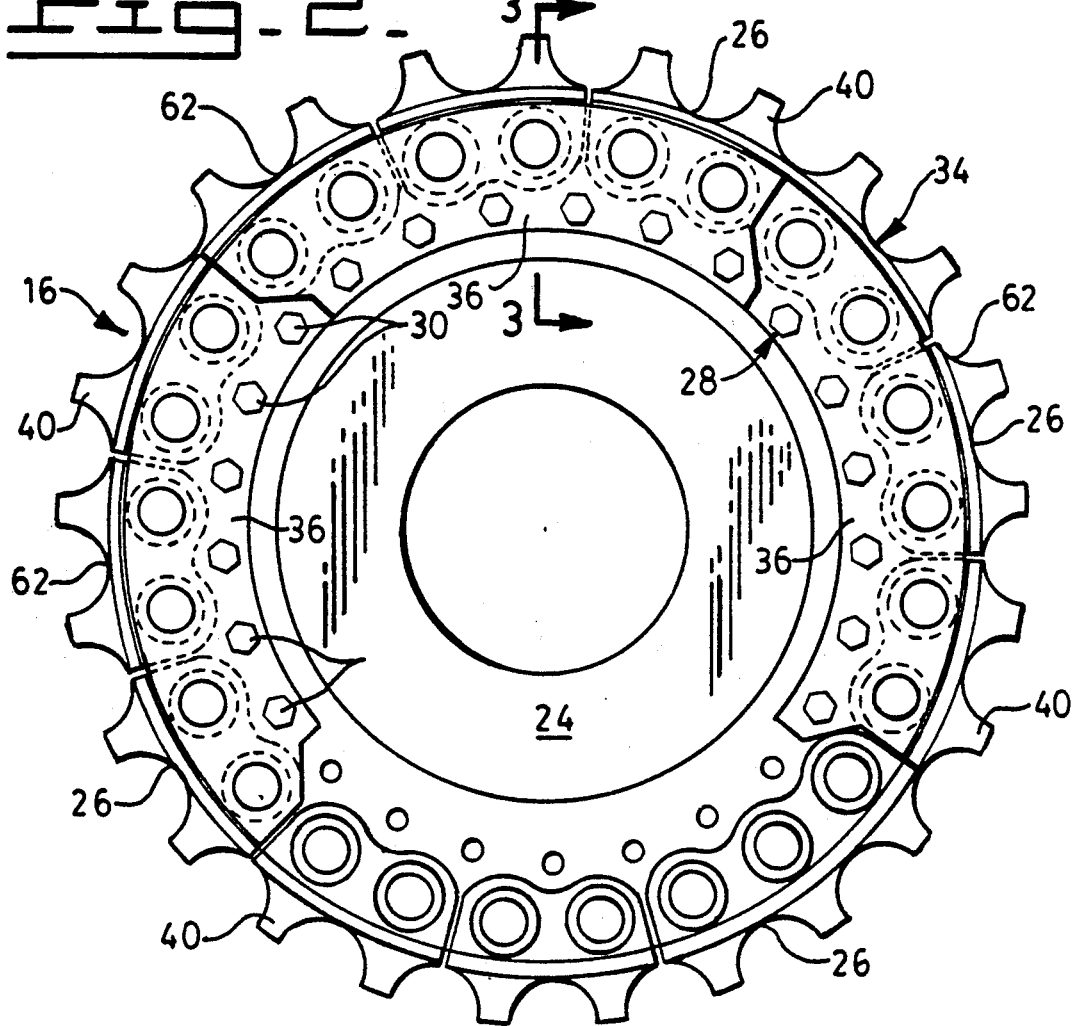
FIG. 2 is an enlarged diagrammatic side elevational view, with portions removed, of a 25 tooth sprocket assembly of the present invention.
Figure 8:
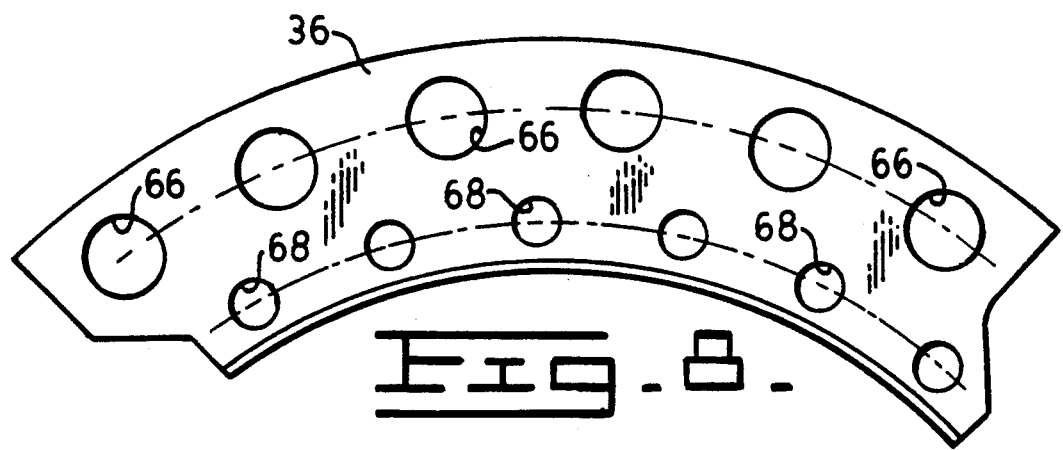
FIG. 8 is an enlarged diagrammatic side elevational view of a side plate of the present invention.
Figure 9:
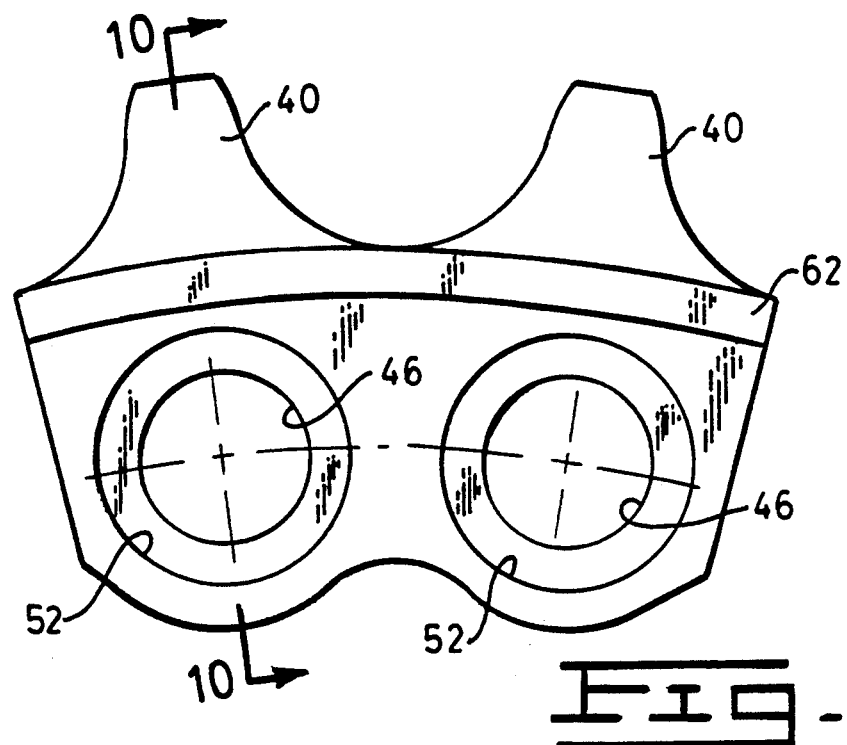
FIG. 9 is an enlarged diagrammatic side elevational view of a teeth segment of the present invention.
Figure 10:
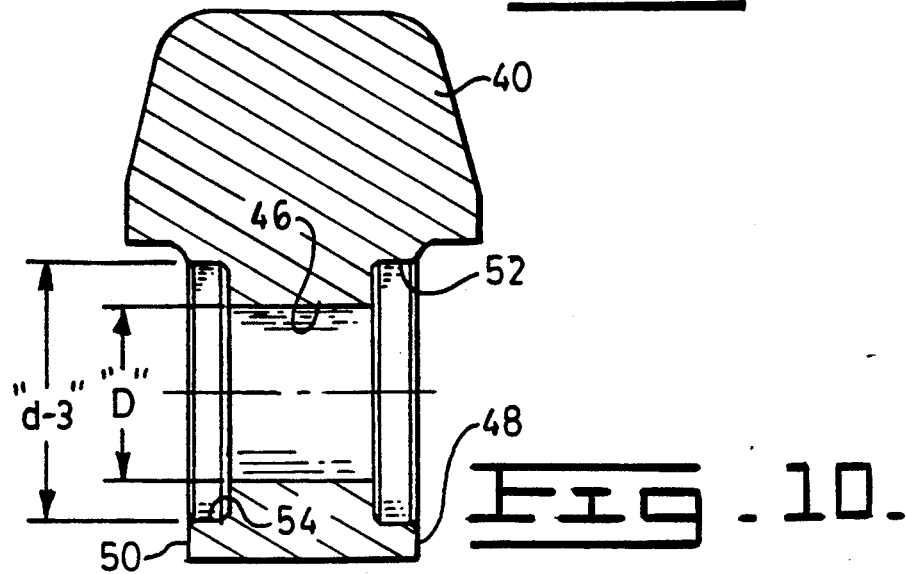
FIG. 10 is a diagrammatic sectional view taken generally along the lines 10—10 of FIG. 9.

With particular reference to FIGS. 2 through 10, the isolated drive sprocket assembly 16 includes a support hub 24, a plurality of arc shaped sprocket segments 26, and means 28 for releasably securing the sprocket segments 26 to the support hub 24, including a plurality of threaded fasteners 30 and nuts 32. The support hub 24 has a radially extending flange portion 33 and each of the sprocket segments 26 is positioned on the flange portion 33 of the support hub 24 adjacent at least two other sprocket segments 26 to form a circular sprocket wheel 34.

Each sprocket segment 26 includes first and second spaced apart arc shaped side plates 36,38, a plurality of replaceable drive teeth 40 positioned between the side plates 36,38, a plurality of resilient washer-like discs 42 positioned between each of the side plates 36,38 and the drive teeth 40, and a plurality of stepped retaining pins 44. The resilient discs 42 are preferably formed of rubber or other deformable material. Each retaining pin 44 is adapted to penetrate the first and second side plates 36,38, a pair of resilient discs 42, and one of the drive teeth 40. Each of the drive teeth 40 has a through bore 46 and first and second side surfaces 48,50, with the side surfaces 48,50 having counterbores 52,54 respectively. One of the resilient discs 42 is adapted to be positioned substantially within each of the counterbores 52,54. The first and second counterbores 52,54 are substantially concentric with the through bore 46. The securing means 28 is adapted to penetrate each of the side plates 36,38 and the support hub flange portion 33 to secure each sprocket segment 26 to the support hub.

Each of the through bores 46 has a first diameter having a dimension "D" and each of the stepped retaining pins 44 has a center portion 56 having a second diameter having a dimension "d". The first diameter dimension "D" is preferably greater than the second diameter dimension "d". Each of the stepped retaining pins 44 also has first and second end portions 58,60 having a third diameter having a dimension "d−1" which is less than the second diameter dimension "d". The center portion 56 of each stepped retaining pin 44 is adapted to be positioned within the through bore 46 of one of the teeth 40 and also to penetrate a pair of the resilient discs 42 which are positioned within the counterbores 52,54.

In the embodiment illustrated in FIGS. 2 through 10, the drive teeth 40 are in the form of tooth segments 62, with each tooth segment 62 having at least two teeth 40. Each of the sprocket segments 26 preferably includes two or three tooth segments 62. In the illustrated embodiment, one of the tooth segments 62 has three teeth 40. The assembled sprocket wheel 34 includes 25 drive teeth 40. In this arrangement, every other tooth 40 contacts the drive portion of the track chain assembly 22, and because of the odd number of teeth 40, the tooth 40 which does not contact the track chain assembly 22 changes with each revolution of the sprocket wheel 34.

With particular reference to FIGS. 3 through 8, it is to be noted that the thickness of the resilient disc 42 is greater than the depth of the counterbores 52,54. In the assembled condition of each sprocket segment 26 on the support hub, this ensures that there is no metal to metal contact between the teeth 40 and the side plates 36,38, thereby resiliently isolating the drive tooth segments 62 from the side plates 36,38. Each of the resilient discs 42 has a through bore 64 with a diameter having a dimension "d−2". The dimension "d−2" is less than the diameter dimension "d" of the stepped retaining pins 44 to ensure that the resilient discs 42 grip the center portion 56 of the retaining pins 44. Also, in the assembled condition of the resilient discs 42 in each of the counterbores 52,54, the discs 42 are in a compressed state. This improves the fatigue life of the discs 42 and seals the bores 46 from dirt and foreign material. The discs 42 are compressed during assembly because the counterbores 52,54 have a diameter dimension "d−3" which is less than the diameter dimension "d−4" of the discs 42 in the free state.

Each of the side plates 36,38 has a plurality of first holes 66 and a plurality of second holes 68. The first holes 66 receive the end portions 58,60 of the retaining pins 44, and the second holes 68 receive the threaded fasteners 30. The smaller diameter of the end portions 58,60 of the retaining pins 44 provides first and second shoulder portions 59,61. In the assembled condition of the sprocket segments 26, the should portions 59,61 prevent the retaining pins from being removed during operation of the drive sprocket 16. The end portions 58,60 are preferably an interference fit with the side plates 36,38.

Figure 11:
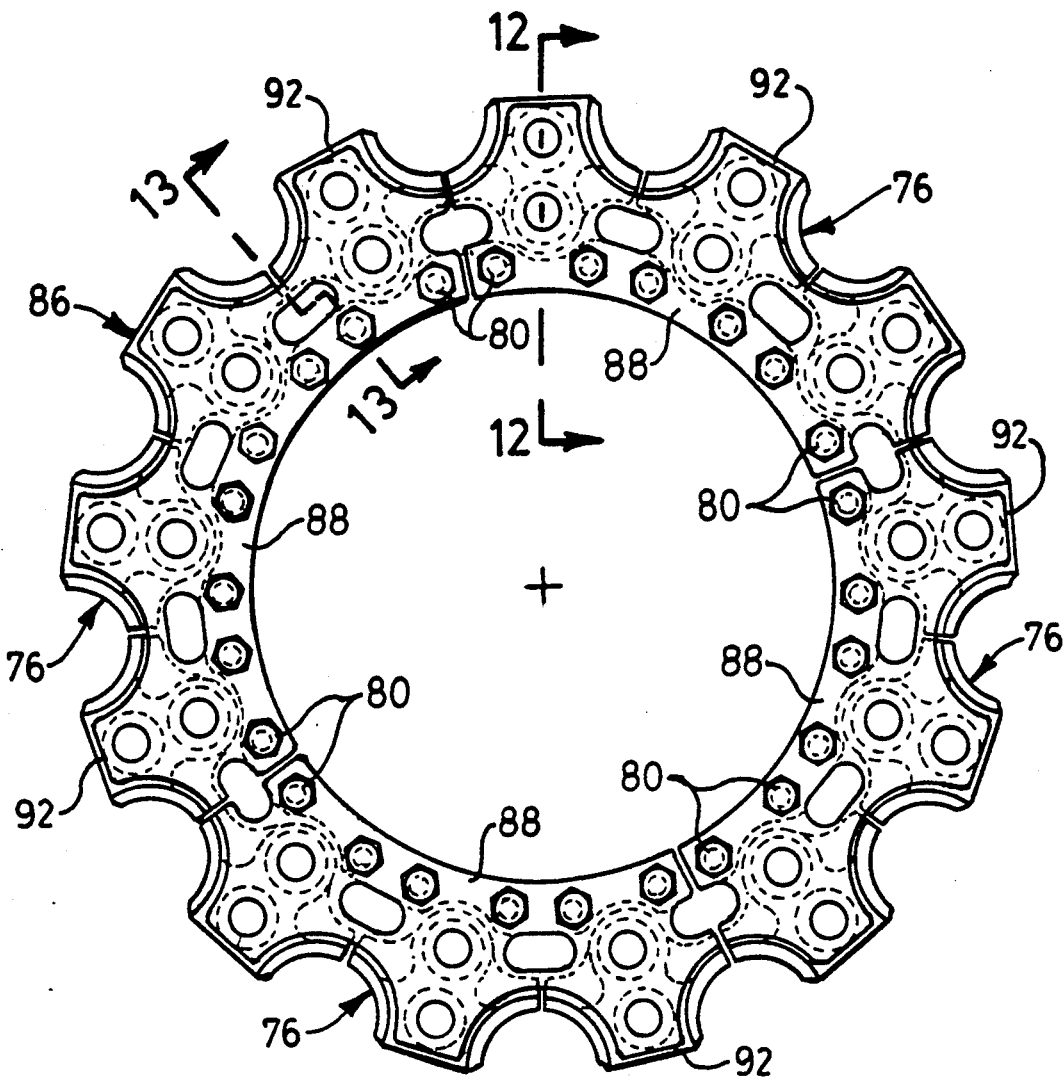
FIG. 11 is a diagrammatic side elevational view of an alternate embodiment of a 13 tooth sprocket assembly of the present invention.
Figure 14:
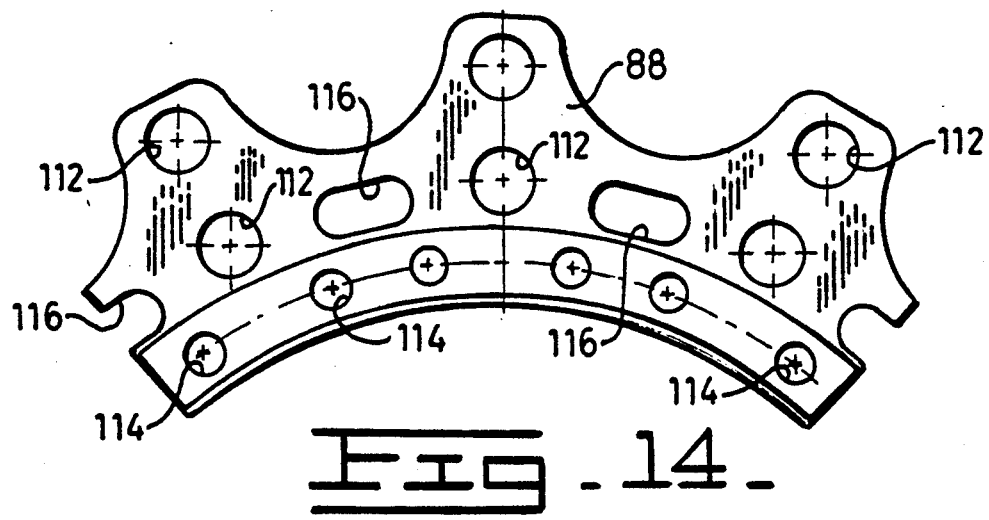
FIG. 14 an enlarged diagrammatic side elevational view of a side plate of the alternate embodiment of the present invention.
Figure 12:
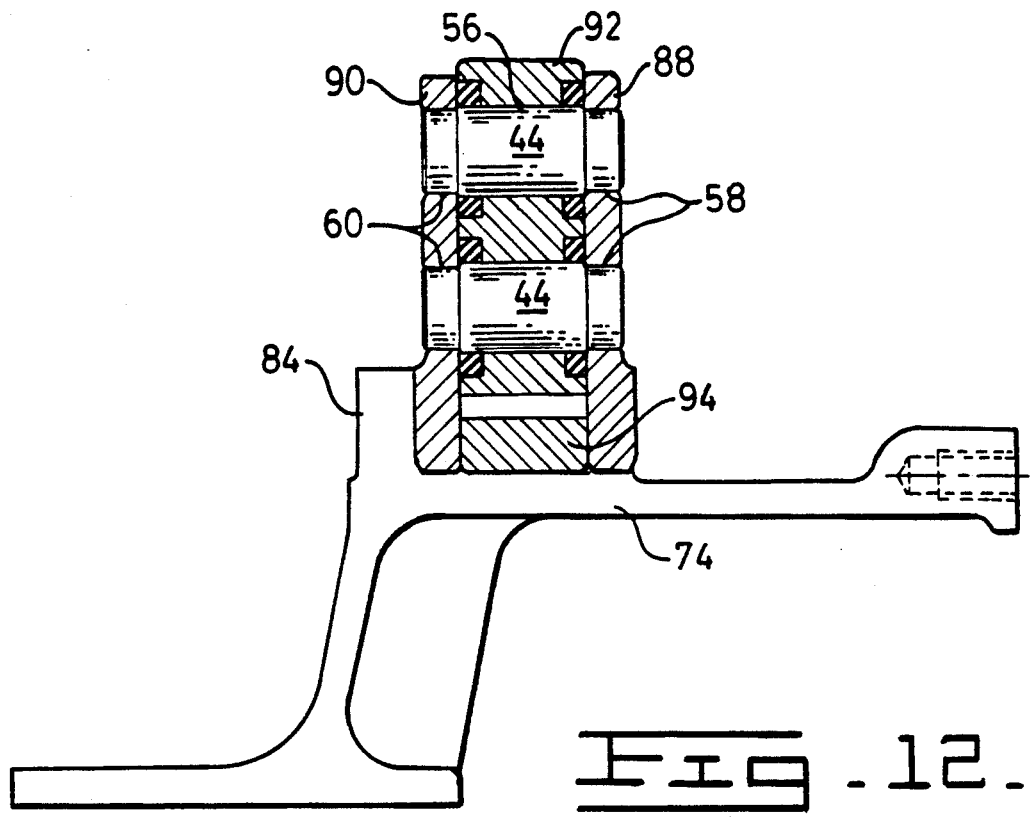
FIG. 12 is an enlarged diagrammatic sectional view taken generally along the lines 12—12 of FIG. 11.
Figure 13:
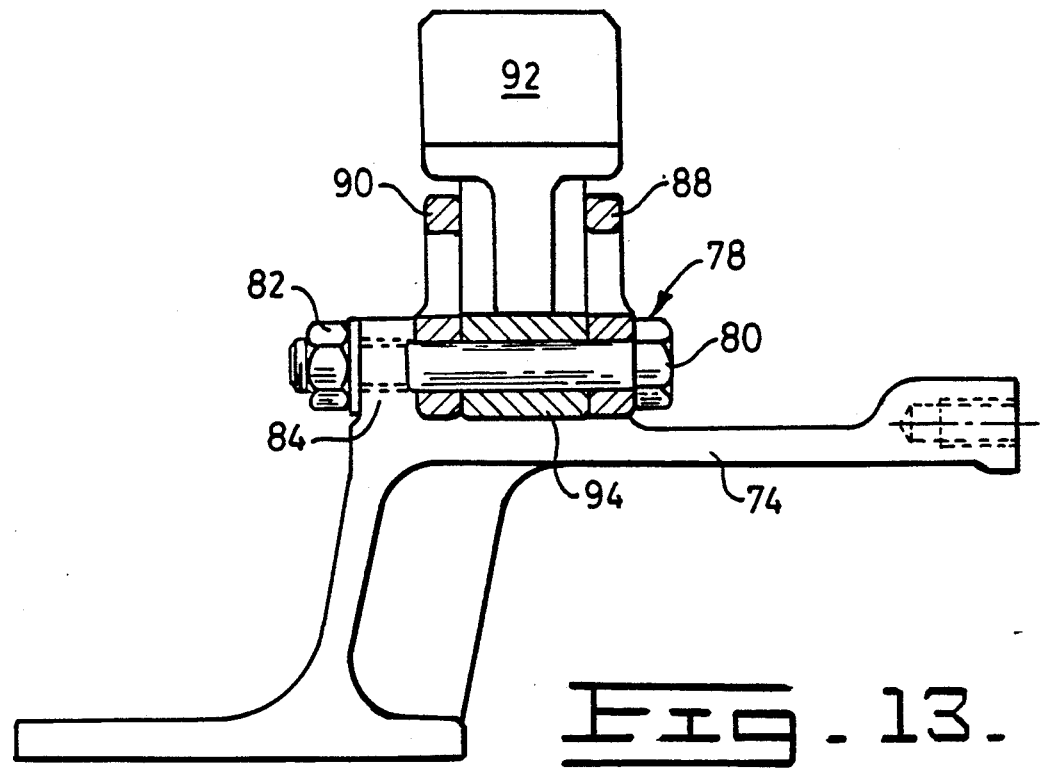
FIG. 13 is an enlarged diagrammatic sectional view taken generally along the lines 13—13 of FIG. 11.
Figure 15:
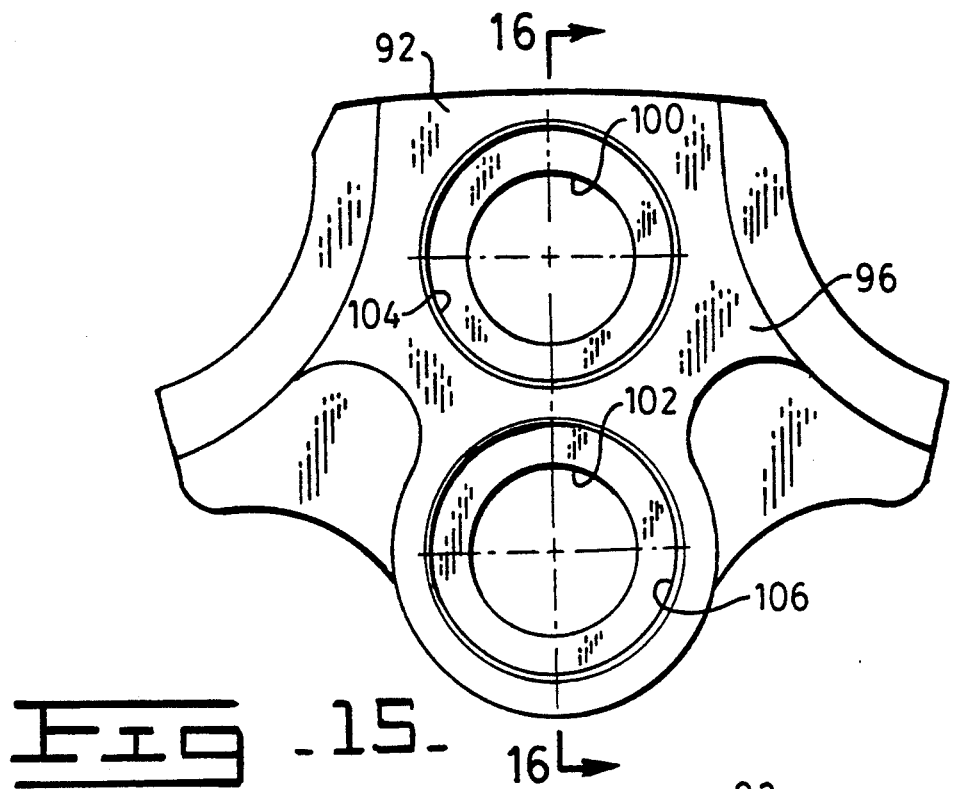
FIG. 15 is an enlarged diagrammatic side elevational view of a drive tooth of the alternate embodiment of the present invention.
Figure 16:
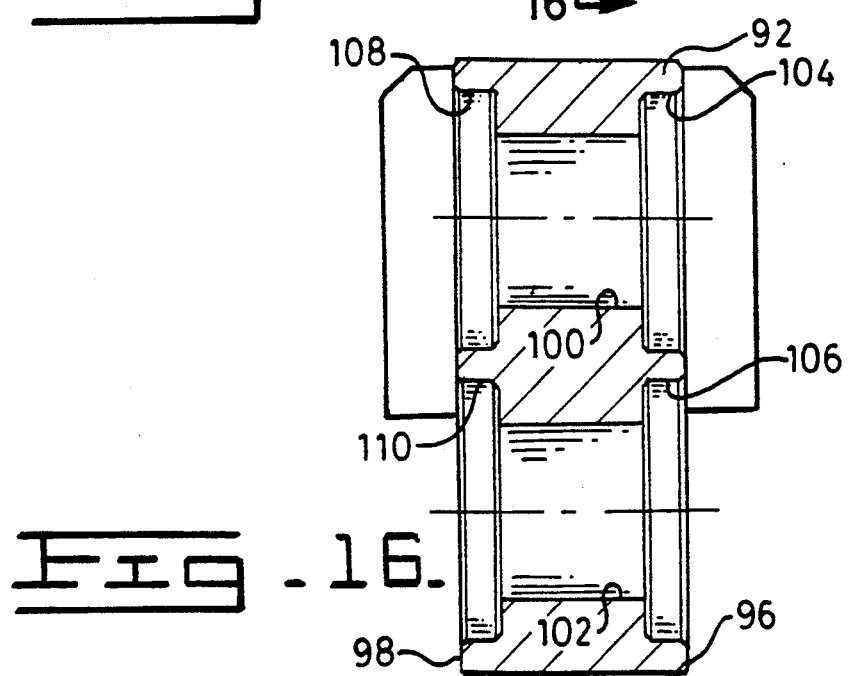
FIG. 16 a diagrammatic sectional view taken generally along the lines 16—16 of FIG. 15.
Figure 17:
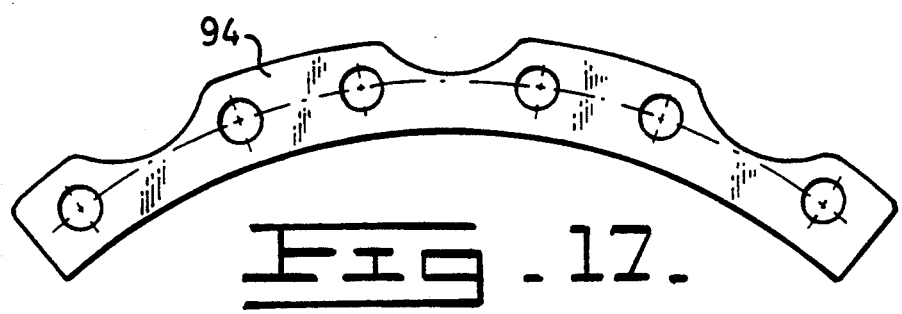
FIG. 17 is an enlarged diagrammatic side elevational a spacer plate of the alternate embodiment of the present invention.

With particular reference to FIGS. 11 through 17, a second embodiment of the subject invention is disclosed. In this embodiment, an isolated drive sprocket assembly 16' includes a support hub 74, a plurality of arc shaped sprocket segments 76, and means 78 for releasably securing the sprocket segments 76 to the support hub 74, including a plurality of threaded fasteners 80 and nuts 82. The support hub 74 has a radially extending flange portion 84 and each of the sprocket segments 76 is adapted to be secured to the flange portion 84 by the securing means 78. Each of the sprocket segments 76 is positioned on the support hub 74 adjacent two other sprocket segments 76 to form a circular sprocket wheel 86.

Each sprocket segment 76 includes first and second spaced apart arc shaped side plates 88,90, a plurality of individual replaceable drive teeth 92 positioned between the side plates 88,90, a plurality of resilient washer-like discs 42 positioned between each of the side plates 88,90 and the drive teeth 92, and a plurality of stepped retaining pins 44. The resilient discs 42 and the stepped retaining pins 44 are substantially similar to those disclosed and described in the previous embodiment. Each sprocket segment 76 also includes an arc shaped spacer plate 94, which is also positioned between the side plates 88,90. It is to be understood that the hub 74 could be designed similar to the hub 24 in the previously described embodiment. This would eliminate the need of the spacer plates 94, since a flange portion similar to flange 84 would fit between the first and second side plates 88,90.

Each of the drive teeth 92 has first and second side surfaces 96,98, first and second through bores 100,102, and first, second, third, and fourth counterbores 104,106,108,110. The first and second counterbores 104,106 are associated with the first side surface 96 and are substantially concentric respectively with the first and second through bores 100,102. The third and fourth counterbores 108,110 are associated with the second side surface 98 and are substantially concentric respectively with the first and second through bores 100,102. One of the resilient discs 42 is adapted to be positioned substantially within each of the counterbores 104,106,108,110. One of the stepped retaining pins 44 is adapted to be positioned within each of the first and second through bores 100,102. As in the previous embodiment, the resilient washer discs 42 grip the center portion 56 of each retaining pin 44 and resiliently isolate the drive teeth 92 from the retaining pins 44 and from the side plates 88,90.

Each of the sprocket segments 76 includes two or three individual drive teeth 92, and one of the sprocket segments includes four individual drive teeth. The illustrated sprocket assembly 16' includes three sprocket segments 76 having three drive teeth 92, and one sprocket segment 76 having four drive teeth 92. This provides a sprocket wheel 86 having 13 drive teeth 92, with each tooth 92 contacting the drive component of the track chain assembly 22 on every revolution of the sprocket wheel 86. Each drive tooth 92 is spaced a predetermined distance "S" from each adjacent drive tooth 92. This allows each drive tooth 92 to move slightly on the resilient discs 42 without contacting the adjacent tooth 92. Although a sprocket assembly 16' has been illustrated having 13 teeth 92, the invention is not limited to a sprocket assembly 16' having this exact number of teeth 92. For example, a sprocket assembly 16' having 12 teeth would function effectively. Such a sprocket assembly 16' would use identical sprocket segments 76 to complete the sprocket wheel 86.

Each of the side plates 88,90 has a plurality of first holes 112, a plurality of second holes 114, and a plurality of elongated through slots 166. As in the previously described embodiment, the first holes 112 receive the end portions 58,60 of the retaining pins 44, and the second holes 114 receive the threaded fasteners 80. The pins 44 are adapted to join the first and second side plates 88,90 to the drive teeth 92. In the assembled condition of the sprocket assembly 16', the threaded fasteners 80 are adapted to penetrate the first and second side plates 88,90, the spacer plates 94, and the flange portion 84, and releasably secure the sprocket segments 76 to the support hub 74. The slots 116 provide an ejection path for dirt and foreign matter trapped in the space between the teeth 92.

INDUSTRIAL APPLICABILITY

The subject isolated drive sprocket assembly 16,16' is particularly useful with earthmoving vehicles and more specifically, track-type vehicles, such as vehicle 10. Power from the engine 12 of the vehicle 10 is transmitted to the powered drive system 14, which then rotates the drive sprocket assembly 16,16'. As the sprocket assembly 16,16' rotates, the teeth 40,92 contact portions of the track chain assembly 22, rotate it, and thereby propel the vehicle Contact between the metal teeth 40,92 and the metal chain assembly 22 generates noise and vibration. Because the teeth 40,92 are isolated from the other components of the sprocket segments 26,76, and from the support hub 24,74, the noise and vibration are not transferred into the support hub 24,74 or the powered drive system 14 where it could be amplified. Also, because of the resilient mounting and isolation of the drive teeth 40,92, each tooth 40,92 is a small member which generates very little noise as it contacts the track chain assembly 22. Any amplification of such noise by the track chain assembly 22 is therefore of small magnitude.

Isolation of the drive teeth 40,92 is provided by the resilient washer-like discs 42. The discs 42 are positioned in the counterbores 52,54,104,106,108,110 of the drive teeth 40,92 and grip the center portion 56 of the retaining pins 44. The thickness of the discs 42 is greater than the depth of the counterbores 52,54,104,106,108,110 so a portion of the resilient discs 42 extend beyond the side surfaces 48,50,96,98 of the drive teeth 40,92. This prevents contact between the side plates 36,38,88,90 and the teeth 40,92. Since the diameter dimension "D" of the tooth bore 46 is larger than the diameter dimension "d" of the retaining pins 44, contact between the teeth 40,92 and the pins 44 is also prevented under normal sprocket to track loads. Under large loads, the resilient discs 42 elastically deform sufficiently to allow contact between the teeth 40,92, and the pins 44. This provides a non-linear tooth stiffness. The resilient discs 42 provide initial elastic deformation for noise reduction and the ultimate contact between the teeth 40,92 and the pins 44 provides high load capacity.

Each of the sprocket segments 26,76 can be preassembled prior to mounting on the support hub 24,74. This provides for repair or replacement of individual teeth 40,92 or sprocket segments 26,76 without disassembling the entire drive sprocket 16,16'.

Other aspects, objects, and advantages of this invention can be obtained from a study of the drawings, the disclosure, and the appended claims.

I claim:

1. An isolated drive sprocket assembly, comprising:
   a support hub having a flange portion;
   a plurality of composite sprocket segments, each composite segment positioned adjacent at least two other composite segments, said plurality of composite segments forming a circular sprocket wheel;
   each composite sprocket segment includes first and second spaced apart side plates, a plurality of replaceable drive teeth positioned between said side plates, a plurality of resilient discs positioned between said side plates and said drive teeth, and a plurality of retaining pins penetrating said side plates, said resilient discs and said drive teeth, said retaining pins being adapted to secure said side plates, said resilient discs, and said drive teeth together to form said composite sprocket segments; and
   means for releasably securing said composite sprocket segments to said support hub.

2. The drive sprocket assembly, as set forth in claim 1, wherein each of said drive teeth has first and second side surfaces, each side surface having a counterbore, and one of said resilient discs being positioned substantially within each of said counterbores.

3. The drive sprocket assembly, as set forth in claim 2, wherein each counterbore has a diameter dimension "d−3" and each of said resilient discs has a diameter dimension "d−4", said diameter dimension "d−4" being greater than diameter dimension "d−3".

4. The drive sprocket assembly, as set forth in claim 1, wherein each of said drive teeth has a through bore and first and second counterbores concentric with said through bore, said through bore having a first diameter "D" and each of said retaining pins having a second diameter "d", said first diameter "D" being greater than said second diameter "d", said through bore adapted to receive one of said retaining pins, and each of said counterbores adapted to receive one of said resilient discs.

5. The drive sprocket assembly, as set forth in claim 1, wherein each of said drive teeth has a through bore having a first diameter "D", and each of said retaining pins has a middle portion having a second diameter "d", said first diameter "D" being greater than said second diameter "d".

6. The drive sprocket assembly, as set forth in claim 1, wherein each composite sprocket segment includes a plurality of tooth segments, each tooth segment having at least two teeth.

7. The drive sprocket assembly, as set forth in claim 6, wherein each composite sprocket segment includes at least two tooth segments.

8. The drive sprocket assembly, as set forth in claim 6, wherein at least one tooth segment has three teeth.

9. The drive sprocket assembly, as set forth in claim 7, wherein at least one composite sprocket segment has one tooth segment having three teeth.

10. The drive sprocket assembly, as set forth in claim 1, wherein each composite sprocket segment includes at least two individual drive teeth.

11. The drive sprocket assembly, as set forth in claim 10, wherein each individual drive tooth is spaced a predetermined distance from each adjacent drive tooth.

12. The drive sprocket assembly, as set forth in claim 1, wherein said securing means is adapted to penetrate said side plates and said support hub flange.

13. The drive sprocket assembly, as set forth in claim 1, wherein each of said drive teeth has first and second through bores and first and second counterbores concentric respectively to said first and second through bores, and third and fourth counterbores concentric respectively to said first and second through bores.

14. The drive sprocket assembly, as set forth in claim 13, wherein one of said resilient discs is adapted to be positioned within each of said first, second, third, and fourth counterbores, and one of said retaining pins is adapted to be positioned within each of said first and second through bores.

15. The drive sprocket assembly, as set forth in claim 1, wherein each of said side plates has a plurality of elongates slots therethrough.

16. A drive sprocket assembly for a track-type vehicle, comprising:

a sprocket support member having a radially extending flange portion;

a plurality of arc shaped composite sprocket segments, each composite segment positioned adjacent two other composite segments and forming a circular sprocket wheel;

each composite sprocket segment having first and second spaced apart side plates, a plurality of replaceable drive tooth segments positioned between said side plates, each tooth segment having at least two teeth, a plurality of retaining pins penetrating said side plates and said tooth segments, and means for resiliently isolating the drive tooth segments from said side plates and said retaining pins, said retaining pins being adapted to secure said side plates, said tooth segments, and said isolating means together to form said composite sprocket segments; and a plurality of threaded fasteners adapted to releasably secure said composite sprocket segments to said support member flange portion.

17. A drive sprocket assembly for driving the endless track of a track-type vehicle, comprising:

a sprocket support hub having a radially extending flange;

a plurality of first and second arc shaped side plates, each side plate having a plurality of elongated through slots;

a plurality of individual replaceable drive teeth, each tooth having first and second through bores and first and second side surfaces, said first side surface having first and second counterbores concentric respectively to said first and second through bores, said second side surface having third and fourth counterbores concentric respectively to said first and second through bores, said drive teeth adapted to be positioned between said first and second side plates;

a plurality of resilient washers, one washer adapted to be positioned within each of said counterbores;

a plurality of retaining pins, one pin adapted to be positioned within each of said drive teeth through bores, and said pins further adapted to join said first and second side plates to said drive teeth; and a plurality of threaded fasteners adapted to penetrate said first and second side plates, and releasably secure said side plates, and said drive teeth to said sprocket support hub.

* * * * *